US010864836B2

(12) United States Patent
Power et al.

(10) Patent No.: US 10,864,836 B2
(45) Date of Patent: Dec. 15, 2020

(54) VEHICLE HAVING GROMMET APPARATUS

(71) Applicants: Richard E Power, Oxford, MI (US); Flor Elena Quiros Perez, Auburn Hills, MI (US); Maurice J Gisler, Rochester Hills, MI (US); Jose Pablo Martinez Acevedo, Rochester Hills, MI (US); Mark Herrell, Shelby Township, MI (US)

(72) Inventors: Richard E Power, Oxford, MI (US); Flor Elena Quiros Perez, Auburn Hills, MI (US); Maurice J Gisler, Rochester Hills, MI (US); Jose Pablo Martinez Acevedo, Rochester Hills, MI (US); Mark Herrell, Shelby Township, MI (US)

(73) Assignee: FCA US LLC, Auburn Hills, MI (US)

( * ) Notice: Subject to any disclaimer, the term of this patent is extended or adjusted under 35 U.S.C. 154(b) by 105 days.

(21) Appl. No.: 16/169,358

(22) Filed: Oct. 24, 2018

(65) Prior Publication Data

US 2020/0130552 A1     Apr. 30, 2020

(51) Int. Cl.
*B60N 3/04*     (2006.01)

(52) U.S. Cl.
CPC .............. *B60N 3/046* (2013.01); *B60N 3/044* (2013.01)

(58) Field of Classification Search
CPC ...... B60N 3/044; B60N 3/046; A47G 27/0418
USPC ............................................................ 16/4
See application file for complete search history.

(56) References Cited

U.S. PATENT DOCUMENTS

| | | | | |
|---|---|---|---|---|
| 1,047,782 A | * | 12/1912 | German .................. | F16B 5/125 24/623 |
| 1,252,255 A | * | 1/1918 | Folmer .............. | A44B 17/0011 24/669 |
| 1,481,784 A | * | 1/1924 | Warner ................... | F16B 21/06 24/694 |
| 1,488,450 A | * | 3/1924 | Dews .................... | F16B 21/186 24/675 |
| 5,775,859 A | * | 7/1998 | Anscher ................ | B60N 3/046 411/38 |
| 6,357,090 B1 | * | 3/2002 | Murai .................. | A44B 99/005 24/590.1 |
| 6,757,945 B2 | * | 7/2004 | Shibuya ............. | A47G 27/0418 16/8 |
| 7,546,661 B2 | * | 6/2009 | Connor, Jr. ............ | B60N 3/046 16/4 |
| 7,945,992 B2 | * | 5/2011 | Parisi ..................... | B60N 3/046 16/4 |

(Continued)

*Primary Examiner* — Jeffrey O'Brien
(74) *Attorney, Agent, or Firm* — Ralph E Smith

(57) ABSTRACT

A grommet apparatus for a vehicle having a first floor and a second floor, and including a pin, a post, a slot grommet and a snap grommet. The pin is fixedly attached to a vehicle floor. The post is attached to the pin. The slot grommet includes a slot-grommet base member and an attachment member attached to each other such that the first floor is positioned therebetween. The pin and the post extend through the slot-grommet base member and the attachment member. The snap grommet is removably coupled to the post and includes a snap-grommet base member and a connecting member that are attached to each other such that the second floor is positioned therebetween. The pin and the post extend at least partially through the snap-grommet base member and the connecting member.

12 Claims, 10 Drawing Sheets

(56) References Cited

U.S. PATENT DOCUMENTS

| | | | |
|---|---|---|---|
| 8,402,605 B2 * | 3/2013 | Courtin | B60N 3/046 16/4 |
| 8,757,698 B1 * | 6/2014 | Rowland | B60N 3/046 296/97.23 |
| 9,340,137 B2 * | 5/2016 | Masanek, Jr. | B60N 3/044 |
| 9,669,745 B2 * | 6/2017 | Machida | B60N 3/046 |
| 9,845,036 B2 * | 12/2017 | Masanek, Jr. | B60N 3/044 |
| 2017/0105563 A1 * | 4/2017 | Dawson | A47G 27/0293 |
| 2019/0092205 A1 * | 3/2019 | Price | B60N 3/044 |
| 2020/0164782 A1 * | 5/2020 | Park | B60N 3/046 |

* cited by examiner

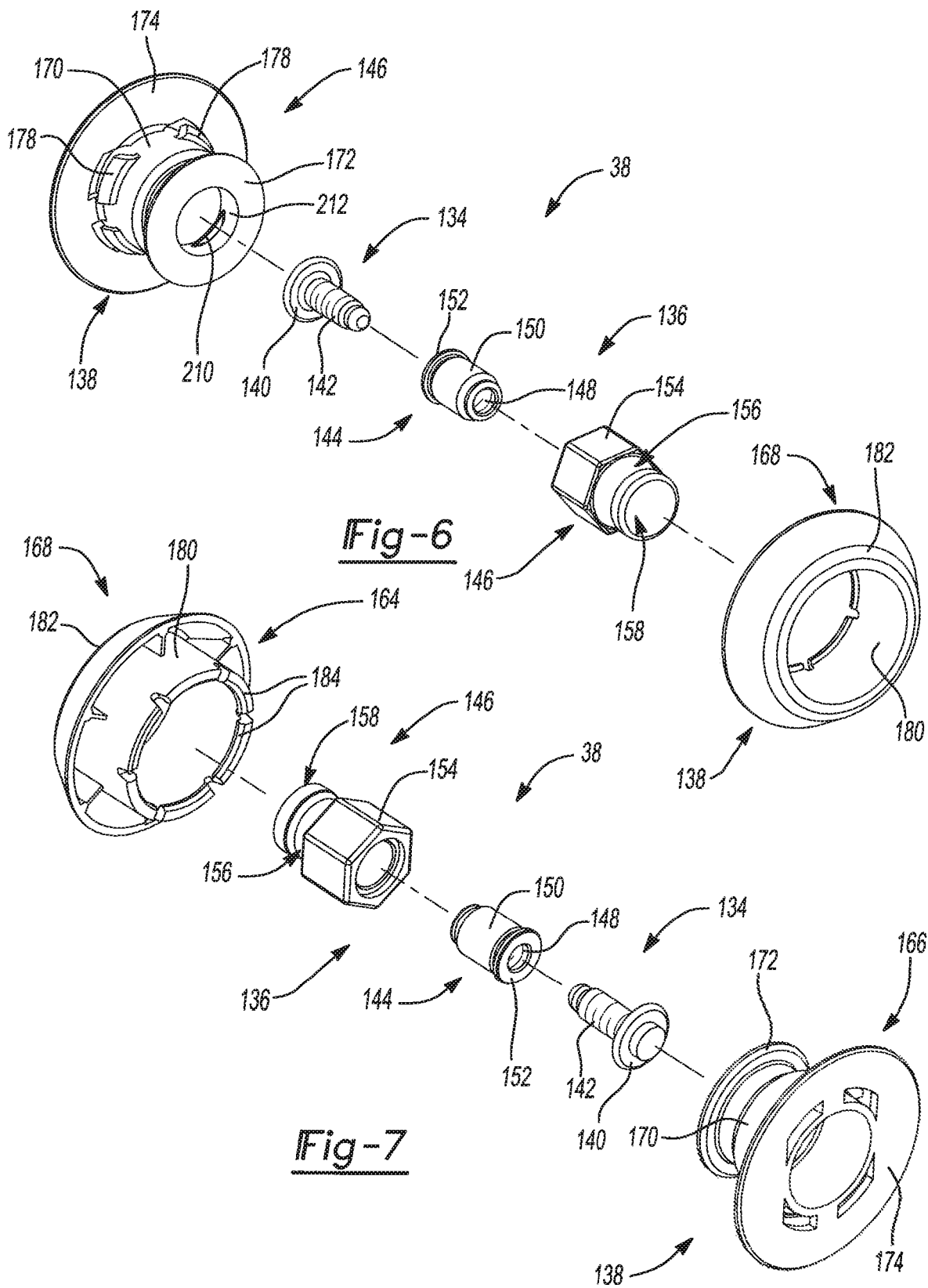

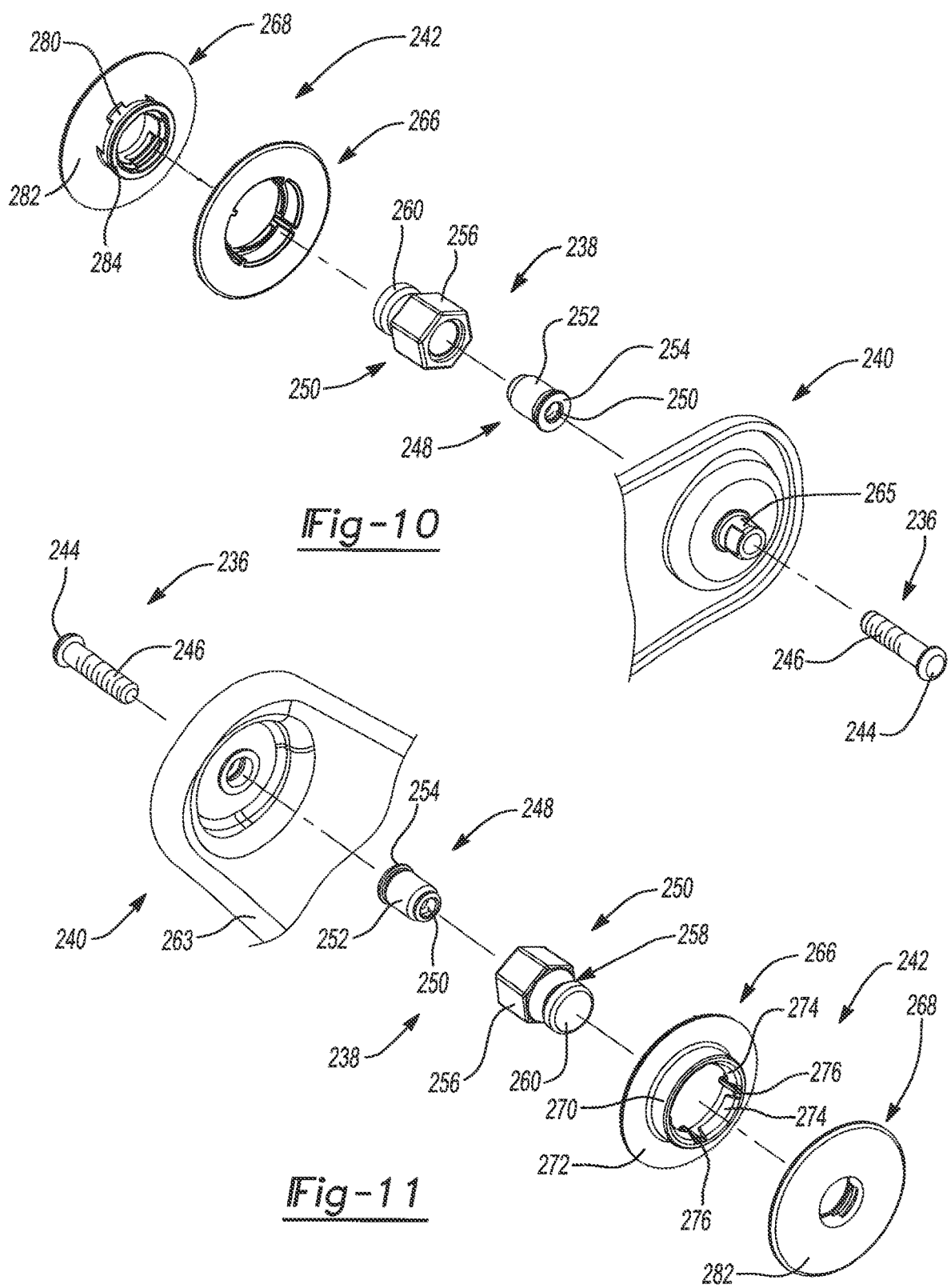

VEHICLE HAVING GROMMET APPARATUS

FIELD

The present disclosure relates to a vehicle having a grommet apparatus.

BACKGROUND

This section provides background information related to the present disclosure and is not necessarily prior art.

Some vehicles include carpets that are removably attached to a floor of a vehicle. Removable carpet can be an inconvenience for a user to operate, thereby providing difficulty for the user to install the carpet into and remove the floor mats out of the vehicle. The present disclosure provides a grommet apparatus that is easy to operate and allows the user to conveniently install the carpet into and remove the carpet out of the vehicle.

SUMMARY

This section provides a general summary of the disclosure, and is not a comprehensive disclosure of its full scope or all of its features.

In one form, a grommet apparatus for a vehicle having a first floor and a second floor is provided. The grommet apparatus includes a pin, a post, a slot grommet and a snap grommet. The pin is fixedly attached to a vehicle floor. The post is attached to the pin. The slot grommet includes a slot-grommet base member and an attachment member attached to each other such that the first floor is positioned therebetween. The pin and the post extend through the slot-grommet base member and the attachment member. The snap grommet is removably coupled to the post and includes a snap-grommet base member and a connecting member that are attached to each other such that the second floor is positioned therebetween. The pin and the post extend at least partially through the snap-grommet base member and the connecting member.

In some configurations of the grommet apparatus of the above paragraph, the slot grommet is movable laterally relative to the first floor.

In some configurations of the grommet apparatus of any one or more of the above paragraphs, the snap grommet restricts vertical movement of the slot grommet when the snap grommet is coupled to the post.

In some configurations of the grommet apparatus of any one or more of the above paragraphs, the post is threadably attached to the pin.

In some configurations of the grommet apparatus of any one or more of the above paragraphs, the snap-grommet base member is disposed on the attachment member.

In some configurations of the grommet apparatus of any one or more of the above paragraphs, a gap exists between the post and the attachment member of the slot grommet to accommodate for misalignment between the slot grommet and the post.

In some configurations of the grommet apparatus of any one or more of the above paragraphs, a top portion of the post is substantially flushed with a top surface of the connecting member of the snap grommet.

In some configurations of the grommet apparatus of any one or more of the above paragraphs, the grommet apparatus further includes another pin, another post and a volcano grommet. The another pin is fixedly attached to the vehicle floor. The another post is attached to the another pin. The volcano grommet is removably coupled to the another post and includes a volcano-grommet base member and a coupling member attached to each other such that the first floor is positioned therebetween. The another pin and the another post extend at least partially through the volcano-grommet base member and the coupling member.

In some configurations of the grommet apparatus of any one or more of the above paragraphs, the another pin extends perpendicular from the pin.

In some configurations of the grommet apparatus of any one or more of the above paragraphs, the volcano-grommet base member and the another post are equal in length.

In some configurations of the grommet apparatus of any one or more of the above paragraphs, an end portion of the another post is substantially flushed with a top surface of the volcano-grommet base member.

In some configurations of the grommet apparatus of any one or more of the above paragraphs, the another post is threadably attached to the another pin.

In another form, a grommet apparatus for a vehicle having a first floor and a second floor is provided. The grommet apparatus includes a pin, a post, and a volcano grommet. The pin is fixedly attached to a vehicle floor. The post is attached to the pin. The volcano grommet is removably coupled to the post and includes a volcano-grommet base member and a coupling member attached to each other such that a floor is positioned therebetween. The pin and the post extend at least partially through the volcano-grommet base member and the coupling member. The volcano-grommet base member and the post are equal in length.

In some configurations of the grommet apparatus of the above paragraph, an end portion of the post is substantially flushed with a top surface of the volcano-grommet base member.

In some configurations of the grommet apparatus of any one or more of the above paragraphs, the volcano-grommet base member and the coupling member are disposed around the post.

In some configurations of the grommet apparatus of any one or more of the above paragraphs, the grommet apparatus further includes another pin, another post, a slot grommet and a snap grommet. The another pin is fixedly attached to the vehicle floor. The another post is attached to the another pin. The slot grommet includes a slot-grommet base member and an attachment member attached to each other such that the first floor is positioned therebetween. The another pin and the another post extend through the slot-grommet base member and the attachment member. The snap grommet is removably coupled to the another post and includes a snap-grommet base member and a connecting member attached to each other such that the second floor is positioned therebetween. The another pin and the another post extend at least partially through the snap-grommet base member and the connecting member. The slot grommet is movable laterally relative the first floor.

In some configurations of the grommet apparatus of any one or more of the above paragraphs, the snap grommet restricts vertical movement of the slot grommet when the snap grommet is coupled to the another post.

In some configurations of the grommet apparatus of any one or more of the above paragraphs, the another post is threadably attached to the another pin.

In some configurations of the grommet apparatus of any one or more of the above paragraphs, the snap-grommet base member is disposed on the attachment member.

In some configurations of the grommet apparatus of any one or more of the above paragraphs, a top portion of the another post is substantially flushed with a top surface of the connecting member of the snap grommet.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 6 is an exploded view of another grommet of the grommet apparatus of FIG. 2;

FIG. 7 is another exploded view of the another grommet of the grommet apparatus of FIG. 2;

FIG. 10 is an exploded view of yet another grommet of the grommet apparatus of FIG. 2;

FIG. 11 is another exploded view of the yet another grommet of the grommet apparatus of FIG. 2.

Corresponding reference numerals indicate corresponding parts throughout the several views of the drawings.

DETAILED DESCRIPTION

Example embodiments will now be described more fully with reference to the accompanying drawings.

Figure 1:
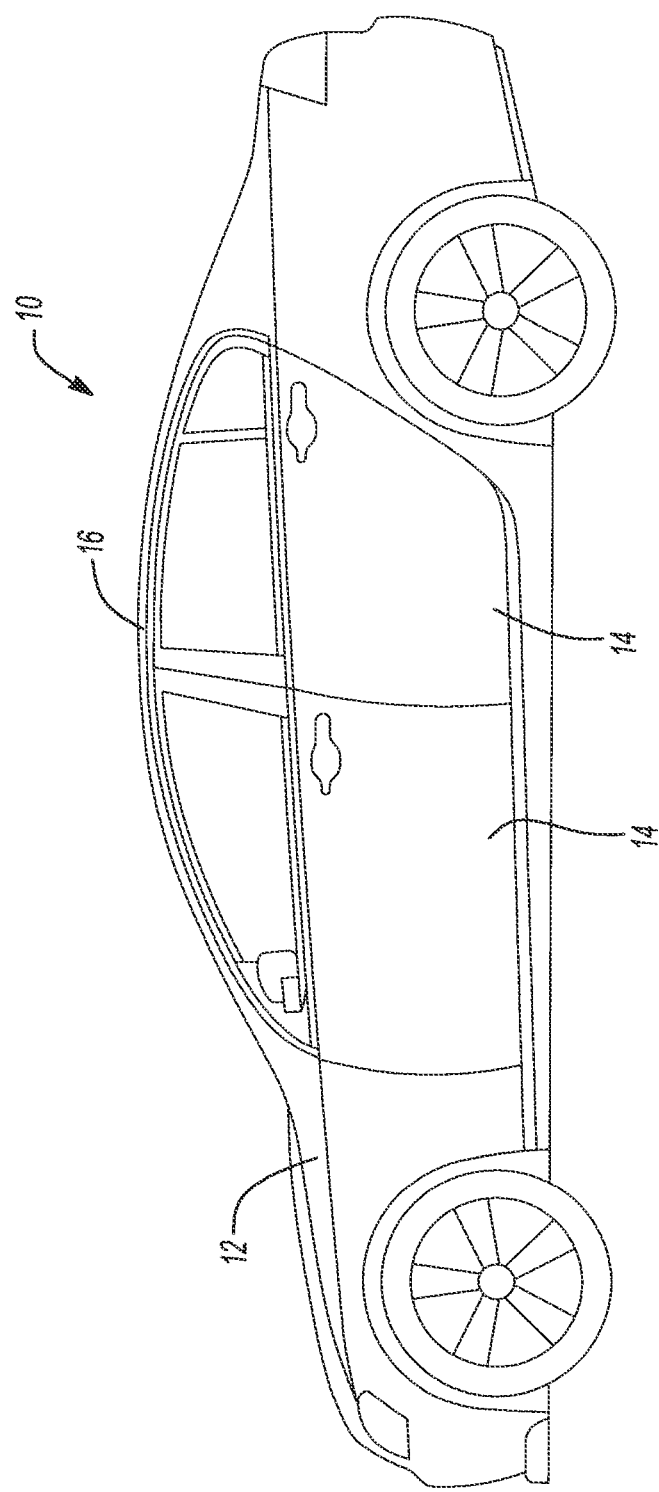
FIG. 1 is a side view of a vehicle having a grommet apparatus according to the principles of the present disclosure.
Figure 2:
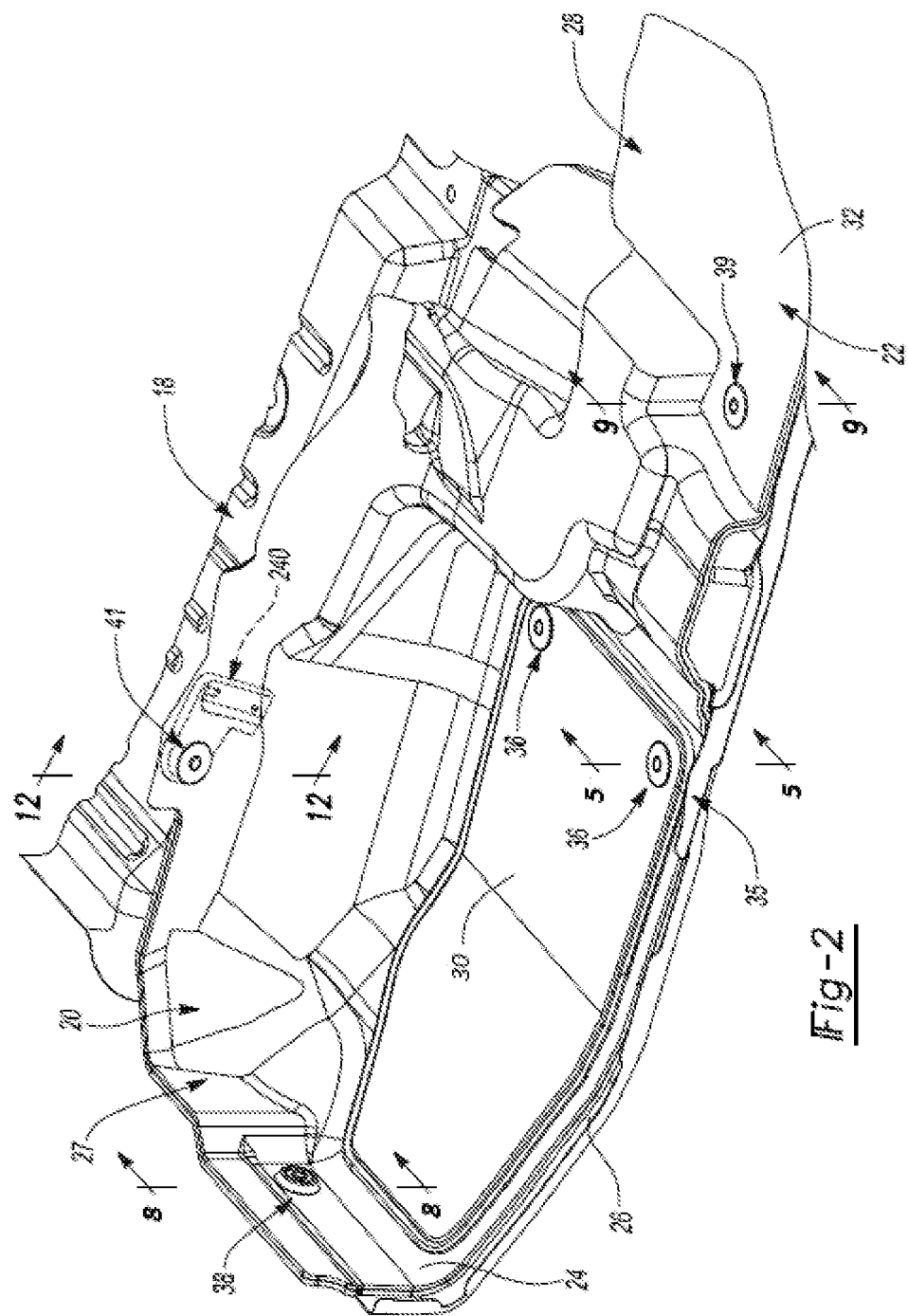
FIG. 2 is a partial perspective view of a cabin of the vehicle having the grommet apparatus.

As shown in FIG. 1, a vehicle 10 is provided. The vehicle 10 includes a vehicle body 12, a plurality of doors 14 and a roof 16. The plurality of doors 14 are rotatable between an open position (not shown) and a closed position. The plurality of doors 14 and the roof 16 are also removably attached to the vehicle body 12. That is, the doors 14 and the roof 16 can be conveniently removed from the vehicle body 12 by a user (not shown). As shown in FIG. 2, the vehicle 10 includes an occupant cabin 18 having a front row 20 and a rear row 22. A front seat assembly (not shown) is disposed in the front row 20 of the occupant cabin 18 and a rear seat assembly (not shown) is disposed in the rear row 22 of the occupant cabin 18.

With reference to FIG. 2, a first floor 24 (e.g., carpet) is removably disposed on a vehicle floor 26 and extends from the front row 20 of the occupant cabin 18 toward the rear row 22 of the occupant cabin 18 at a location between a driver foot well 27 and a backseat foot well 28 (i.e., a foot well used by an occupant (not shown) sitting on the rear seat assembly disposed in the rear row 22 of the occupant cabin 18). A second floor 30 (e.g., a floor mat) is disposed on the first floor 24 and in the driver foot well 27, for example. A third floor 32 (e.g., carpet) is removably disposed on the vehicle floor 26 and extends from the rear row 22 of the occupant cabin 18 to the front row 20 of the occupant cabin 18 at a location between the driver foot well 27 and the backseat foot well 28. At least a portion of the first floor 24 between the driver foot well 27 and the backseat foot well 28 is also disposed between the third floor 32 and the vehicle floor 26.

A grommet apparatus 35 is provided that includes a plurality of grommet assemblies 36, 38, 39, 41. The grommet assemblies 36 removably attach the first floor 24 and the second floor 30 to the vehicle floor 26. The grommet assembly 38 removably attaches the first floor 24 to the vehicle floor 26. The grommet assembly 39 removably attaches the first floor 24 and the third floor 32 to the vehicle floor 26.

Figure 3:
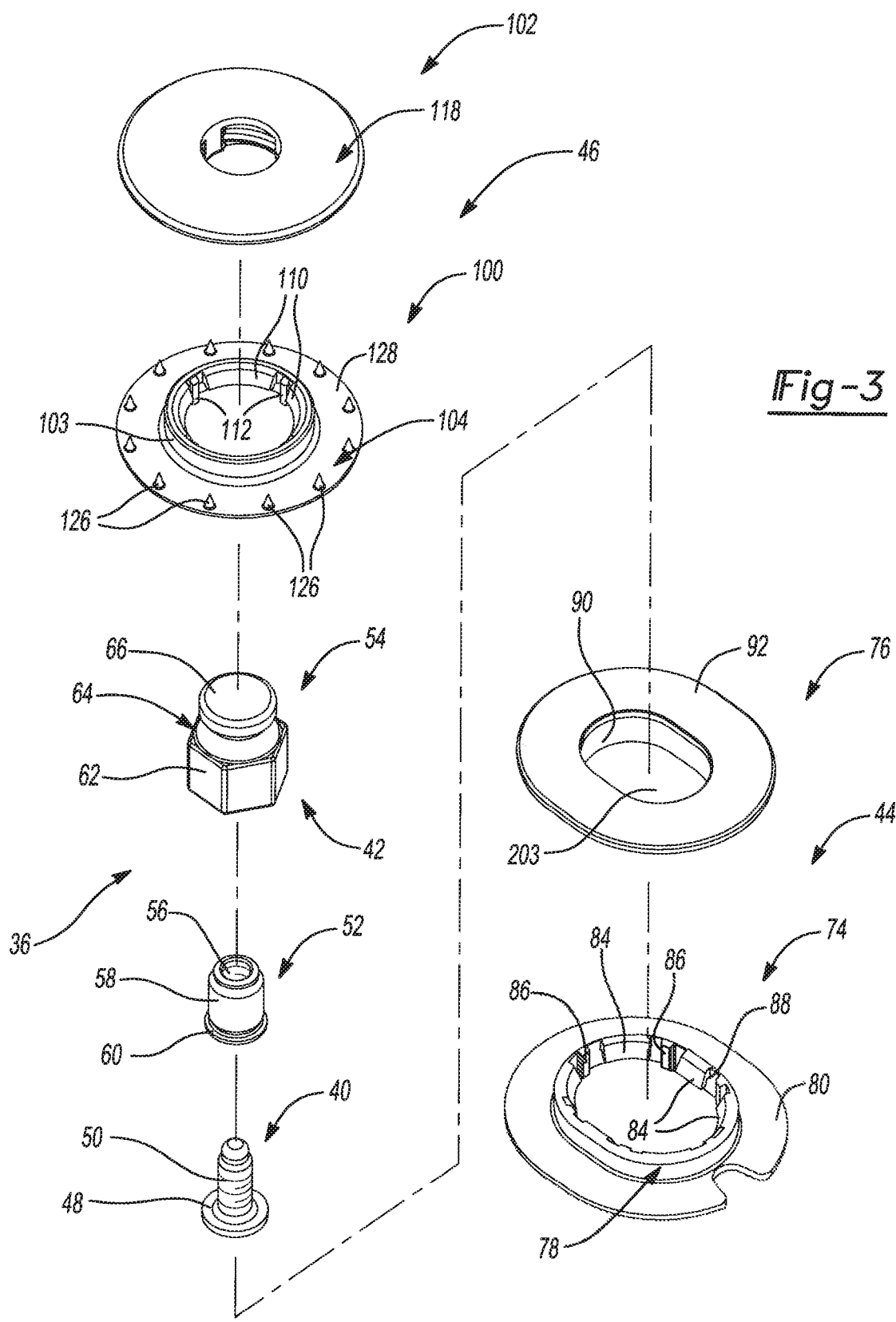
FIG. 3 is an exploded view of one grommet of the grommet apparatus of FIG. 2.
Figure 4:
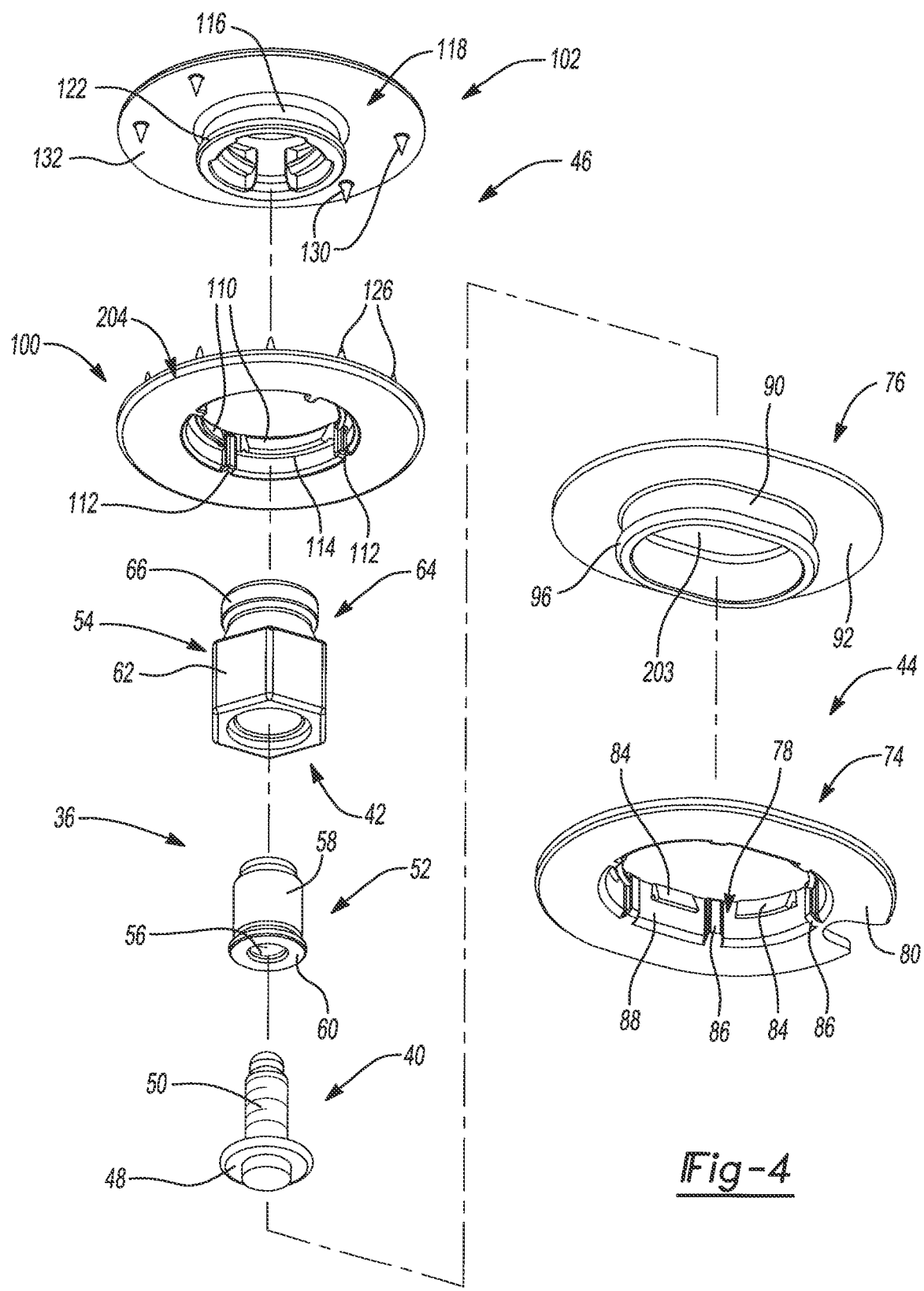
FIG. 4 is another exploded view of the one grommet of the grommet apparatus.
Figure 5:
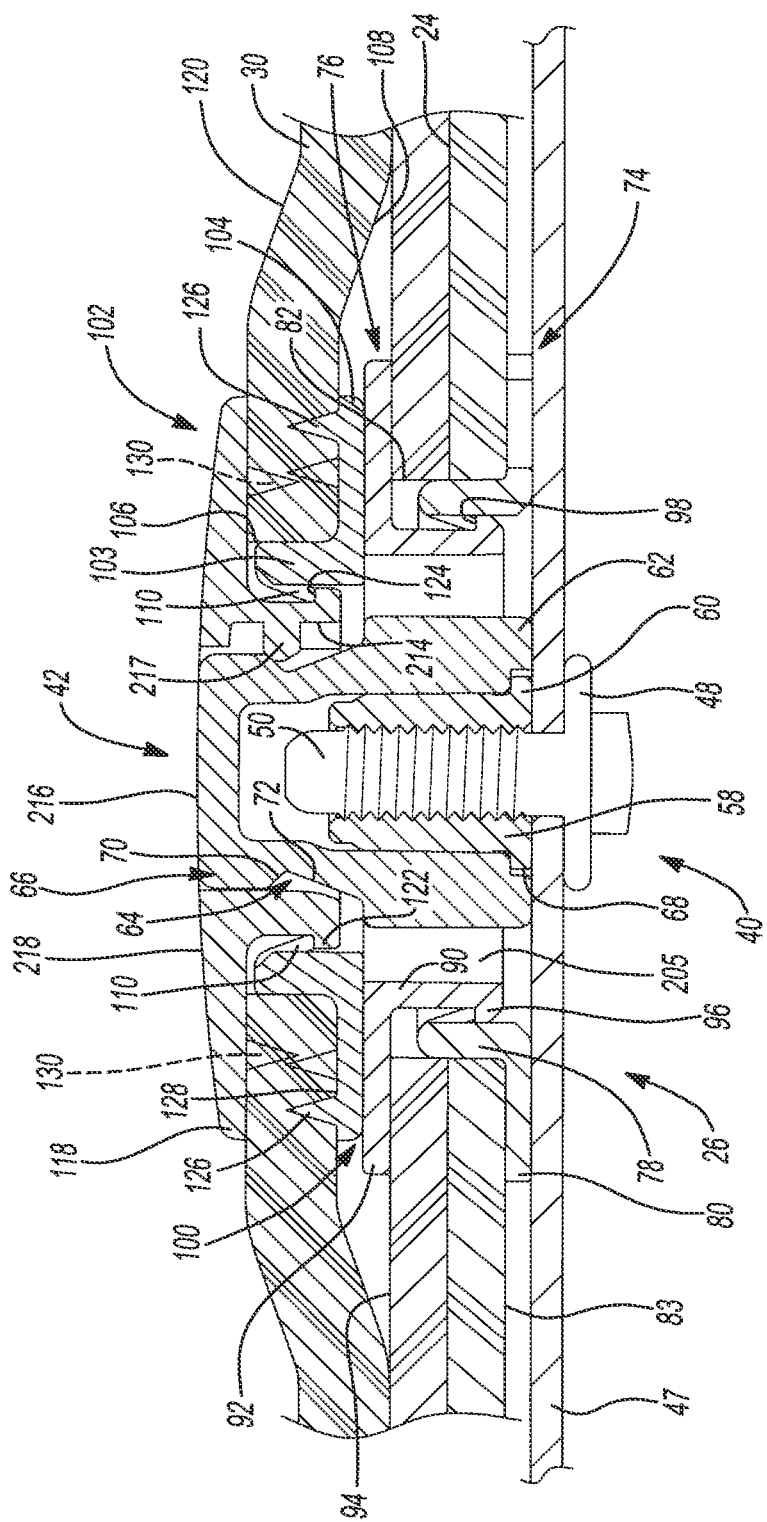
FIG. 5 is a cross-sectional view of the one grommet taken along line 5-5 of FIG. 2.

As shown in FIGS. 3-5, each grommet assembly 36 includes a pin 40, a post 42, a slot grommet 44 and a snap grommet 46. The pin 40 is fixedly attached (e.g., welded) to a horizontal portion 47 of the vehicle floor 26 in the driver foot well 27 and extends upwardly therefrom (i.e., in a direction perpendicular to a longitudinal axis of the vehicle 10). The pin 40 includes a head portion 48 and a shaft portion 50. The head portion 48 is fixedly attached to the horizontal portion 47 of the vehicle floor 26. The circular-shaped shaft portion 50 is threaded and extends from the head portion 48.

The post 42 is attached (e.g., threadably attached) to the pin 40 and includes an inner housing 52 and an outer housing 54. The inner housing 52 and the outer housing 54 are fixedly attached to each other using any suitable means (e.g., injection molding). The inner housing 52 is circular-shaped and includes an opening 56 extending therethrough. The opening 56 is threaded such that the inner housing 52 of the post 42 is threadably attached to the shaft portion 50 of the pin 40. The inner housing 52 also includes a stem 58 and an annular-shaped lip 60 extending radially outwardly from an end of the stem 58.

The outer housing 54 includes a body 62, a groove 64 and an end portion 66. As shown in FIG. 5, an annular recess 68 formed in an end of the body 62 receives the lip 60 of the inner housing 52. The groove 64 is positioned between the body 62 and the end portion 66 and defines an attachment angled surface 70 and a transitional angled surface 72. The attachment angled surface 70 extends inwardly from an end of the end portion 66 to an end of the transitional angled surface 72. The transitional angled surface 72 extends inwardly from an end of the body 62 to an end of the attachment angled surface 70.

With reference to FIGS. 3-5, the slot grommet 44 includes a slot-grommet base member 74 and an attachment member 76 attached to each other such that the first floor 24 is positioned or sandwich therebetween (FIG. 5). The slot-grommet base member 74 includes a tubular-shaped body 78 and an annular-shaped flange 80 extending radially outwardly from an end of the body 78. The tubular-shaped body 78 is inserted through a bottom of an opening 82 of the first floor 24 such that the flange 80 contacts a bottom surface 83 of the first floor 24. A plurality of flexible catches 84 and a plurality of rectangular-shaped spacers 86 extend radially inwardly from an inner surface 88 of the body 78. The flexible catches 84 and the spacers 86 are also arranged in an alternating fashion around the inner surface 88 of the body 78.

The attachment member 76 includes a tubular-shaped body 90 and an annular-shaped flange 92 extending radially outwardly from an end of the body 90. The body 90 is inserted through a top of the opening 82 of the first floor 24 such that the flange 92 contacts a top surface 94 of the first floor 24. A rim 96 extends radially outwardly from another end of the body 90. When the body 78 is fully inserted through the bottom of the opening 82 of the first floor 24 and the body 90 is fully inserted through the top of the opening 82 of the first floor 24, the plurality of flexible catches 84 snap into engagement with the rim 96 such that the slot-grommet base member 74 and the attachment member 76 are attached to each other (i.e., the flexible catches 84 contact a top side 98 of the rim 96 to prevent the slot-grommet base member 74 and the attachment member 76 from separating from each other). In this way, the slot grommet 44 is secured to the first floor 24 and the first floor 24 is positioned between the slot-grommet base member 74 and the attachment member 76.

With reference to FIGS. 3-5, the snap grommet 46 includes a snap-grommet base member 100 and a connecting member 102 attached to each other such that the second floor 30 is positioned or sandwich therebetween (FIG. 5). The snap-grommet base member 100 includes a tubular-shaped body 103 and an annular-shaped flange 104 extending radially outwardly from an end of the body 103. The tubular-shaped body 103 is inserted through a bottom of an opening 106 of the second floor 30 such that the flange 104 contacts a bottom surface 108 of the second floor 30. A plurality of flexible catches 110 and a plurality of rectangular-shaped spacers 112 extend radially inwardly from an inner surface 114 of the body 103. The flexible catches 110 and the spacers 112 are also arranged in an alternating fashion around the inner surface 114 of the body 103.

The connector member 102 includes a tubular-shaped body 116 and an annular-shaped flange 118 extending radially outwardly from an end of the body 116. The body 116 is inserted through a top of the opening 106 of the second floor 30 such that the flange 118 contacts a top surface 120 of the second floor 30. A rim 122 extends radially outwardly from another end of the body 116. When the body 103 is fully inserted through the bottom of the opening 106 of the second floor 30 and the body 116 is fully inserted through the top of the opening 106 of the second floor 30, the plurality of flexible catches 110 snap into engagement with the rim 122 such that the snap-grommet base member 100 and the connecting member 102 are attached to each other (i.e., the flexible catches 110 contact a top side 124 of the rim 122 to prevent the snap-grommet base member 100 and the connecting member 102 from separating from each other). In this way, the snap grommet 46 is secured to the second floor 30 and the second floor 30 is positioned between the snap-grommet base member 100 and the connecting member 102.

A plurality of conical-shaped teeth 126 are disposed around and extend upwardly from a top surface 128 of the flange 104. A plurality of conical-shaped teeth 130 extend downwardly from a bottom surface 132 of the flange 118. When the snap-grommet base member 100 and the connecting member 102 are attached to each other as described above, the teeth 126, 130 bite into the second floor 30 such that the snap grommet 46 is secured to the second floor 30 (i.e., the snap grommet 46 does not move relative to the second floor 30).

Figure 8:
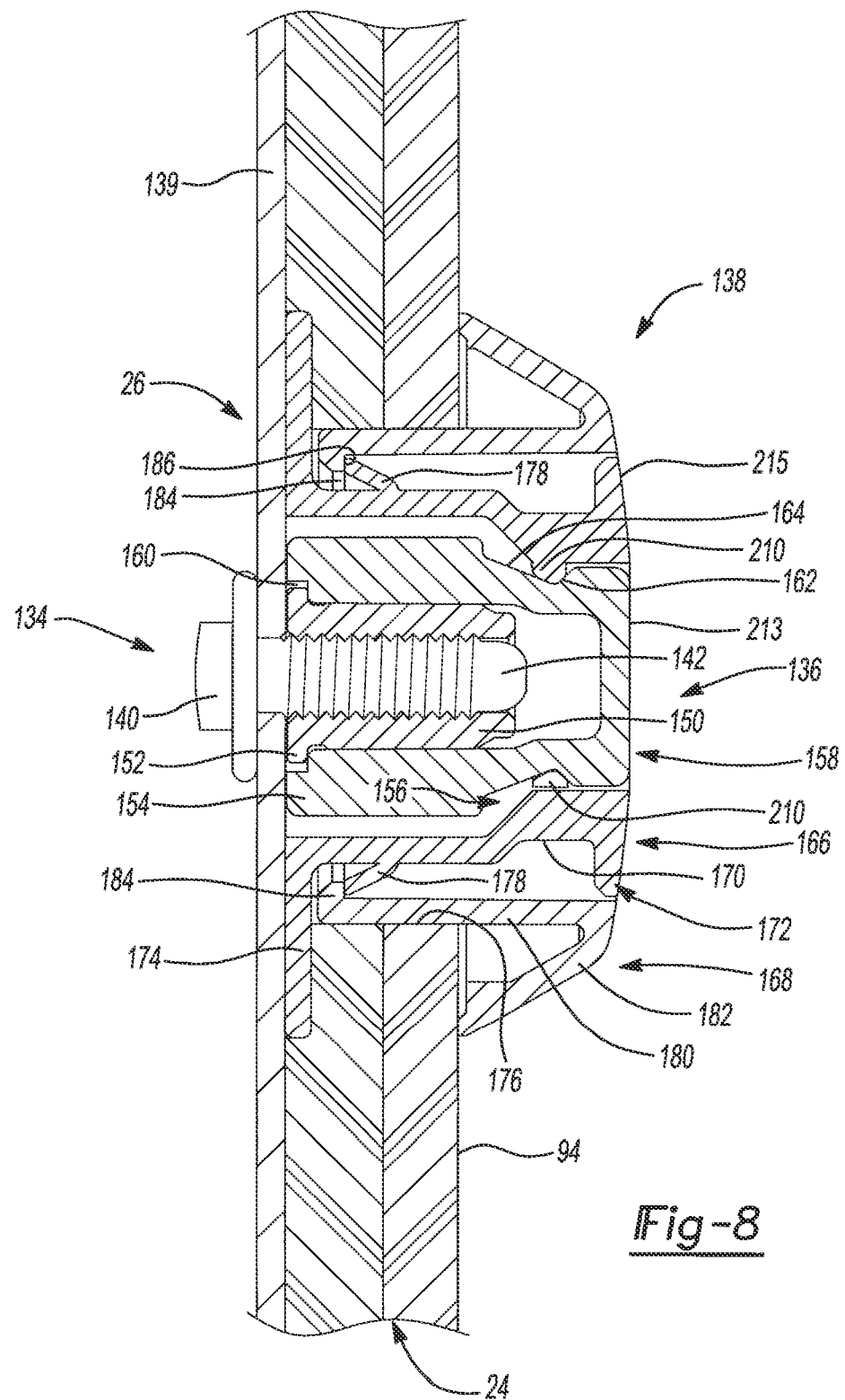
FIG. 8 is a cross-sectional view of the another grommet taken along line 8-8 of FIG. 2.

As shown in FIGS. 6-8, the grommet assembly 38 includes a pin 134, a post 136 and a volcano grommet 138. The pin 134 is fixedly attached (e.g., welded) to a vertical portion 139 of the vehicle floor 26 in the driver foot well 27 and extends outwardly therefrom (i.e., in a direction perpendicular to a longitudinal axis of the pin 40). The pin 134 includes a head portion 140 and a shaft portion 142. The head portion 140 is fixedly attached to the vertical portion 139 of the vehicle floor 26. The circular-shaped shaft portion 142 is threaded and extends from the head portion 140.

The post 136 is attached (e.g., threadably attached) to the pin 134 and includes an inner housing 144 and an outer housing 146. The inner housing 144 and the outer housing 146 are fixedly attached to each other using any suitable means (e.g., injection molding). The inner housing 144 is circular-shaped and includes an opening 148 extending therethrough. The opening 148 is threaded such that the inner housing 144 of the post 136 is threadably attached to the shaft portion 142 of the pin 134. The inner housing 144 also includes a stem 150 and an annular-shaped lip 152 extending radially outwardly from an end of the stem 150.

The outer housing 146 includes a body 154, a groove 156 and an end portion 158. As shown in FIG. 8, an annular recess 160 formed in an end of the body 154 receives the lip 152 of the inner housing 144. The groove 156 is positioned between the body 154 and the end portion 158 and defines an attachment angled surface 162 and a transitional angled surface 164. The attachment angled surface 162 extends inwardly from an end of the end portion 158 to an end of the transitional angled surface 164. The transitional angled surface 164 extends inwardly from an end of the body 154 to an end of the attachment angled surface 162.

As shown in FIGS. 6-8, the volcano grommet 138 includes a volcano-grommet base member 166 and a coupling member 168 attached to each other such that the first floor 24 is positioned or sandwich therebetween. The volcano-grommet base member 166 is equal in length with the post 136 (FIG. 8) and includes a tubular-shaped body 170, an annular-shaped top flange 172 extending radially outwardly from an end of the body 170 and an annular-shaped bottom flange 174 extending radially outwardly from another end of the body 170. The bottom flange 174 extends radially outwardly from the body 170 a further distance than the top flange 172. The tubular-shaped body 170 is inserted through a bottom of an opening 176 of the first floor 24 such that the bottom flange 174 contacts the first floor 24. A plurality of flexible catches 178 extend radially outwardly from and around an outer surface 179 of the body 170 at or near the another end.

The coupling member 168 includes a tubular-shaped body 180 and a flange 182 extending downwardly on an angle from an end of the body 180. The body 180 is inserted through a top of the opening 176 of the first floor 24 such that the flange 182 contacts the top surface 94 of the first floor 24. A plurality of projections 184 extend radially inwardly from another end of the body 180. When the body 170 is fully inserted through the bottom of the opening 176 of the first floor 24 and the body 180 is fully inserted through the top of the opening 176 of the first floor 24, the plurality of flexible catches 178 snap into engagement with the projections 184 such that the volcano-grommet base member 166 and the coupling member 168 are attached to each other (i.e., the flexible catches 178 contact a top side 186 of the projections 184 to prevent the volcano-grommet base member 166 and the coupling member 168 from separating from each other). In this way, the volcano grommet 138 is secured to the first floor 24 and the first floor 24 is positioned between the volcano-grommet base member 166 and the coupling member 168.

Figure 9:
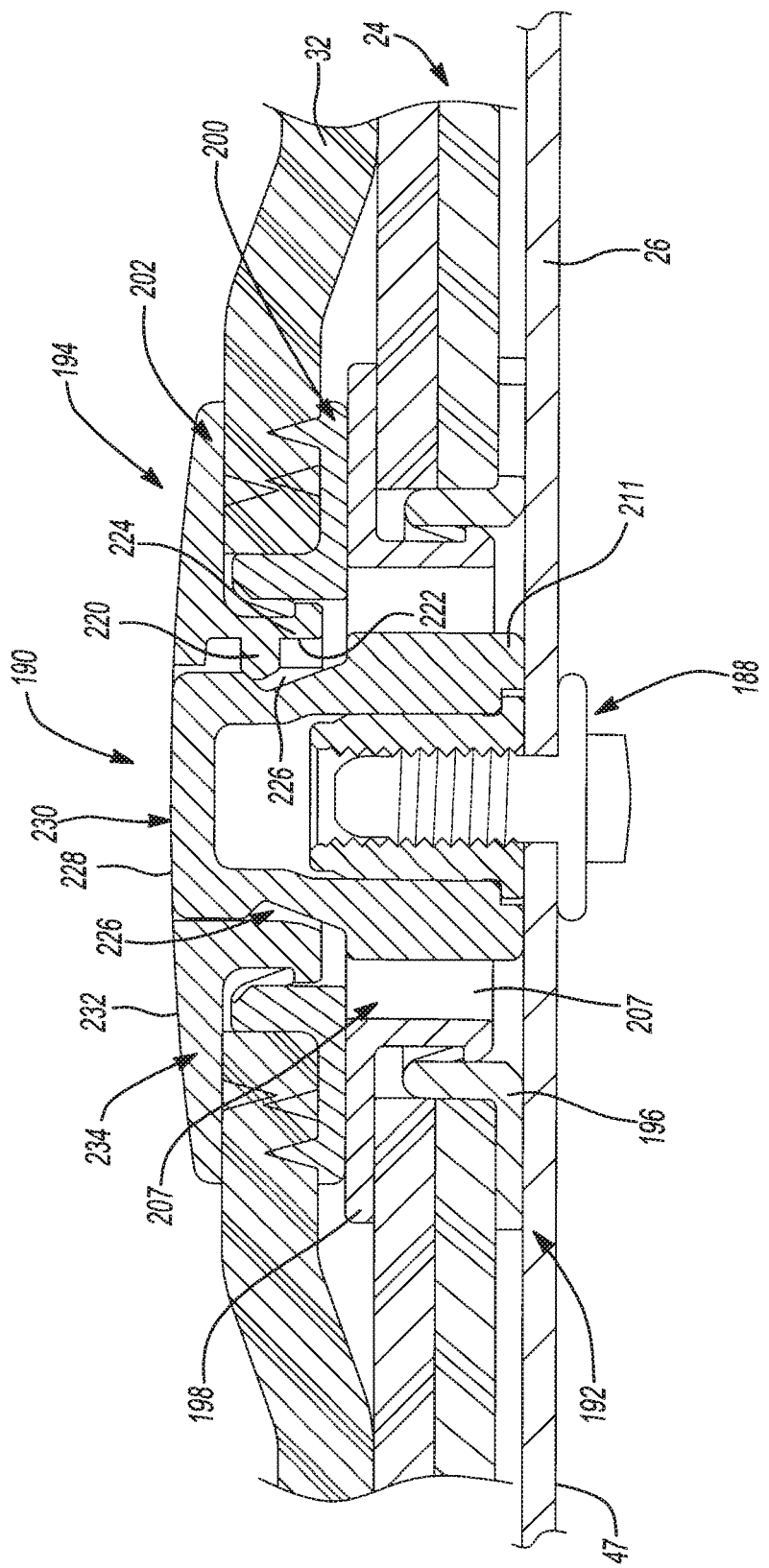
FIG. 9 is a cross-sectional view of the one grommet taken along line 9-9 of FIG. 2.

As shown in FIG. 9, the grommet assembly 39 includes a pin 188, a post 190, a slot grommet 192 and a snap grommet 194. The pin 188, the post 190, the slot grommet 192 and the snap grommet 194 may be similar or identical to that of the pin 40, the post 42, the slot grommet 44 and the snap grommet 46, respectively, described above, and therefore, will not be described again in detail. As shown in FIG. 9, the pin 188 is fixedly attached (e.g., welded) to the horizontal portion 47 of the vehicle floor 26 in the backseat foot well 28 and extends upwardly therefrom. The post 190 is attached (e.g., threadably attached) to the pin 188.

The slot grommet 192 includes a slot-grommet base member 196 and an attachment member 198 attached to each other such that the first floor 24 is positioned or sandwich therebetween. The snap grommet 194 includes a snap-grommet base member 200 and a connecting member 202 attached to each other such that the third floor 32 is positioned or sandwich therebetween.

Figure 12:
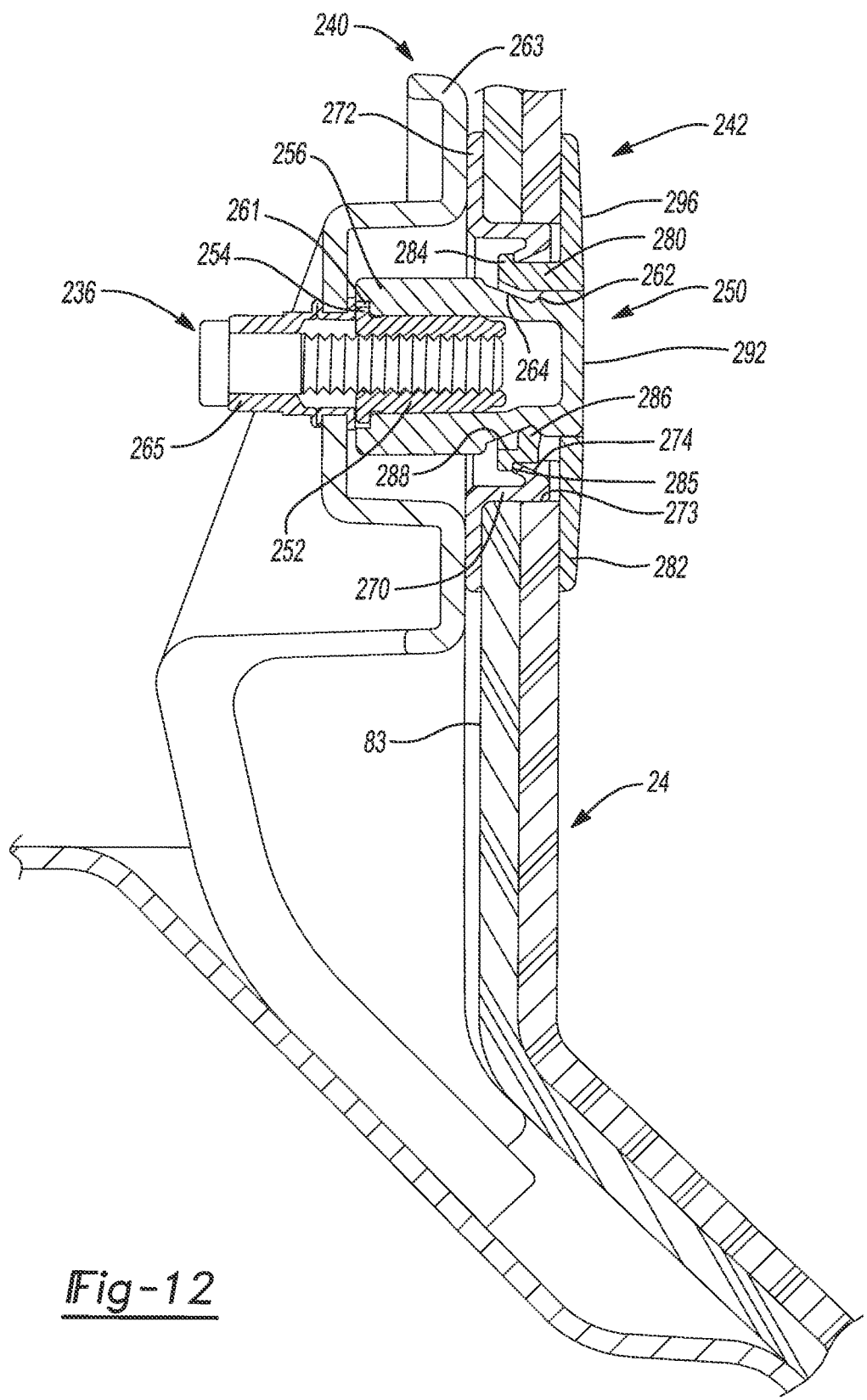
FIG. 12 is a cross-sectional view of the yet another grommet taken along line 12-12 of FIG. 2.

As shown in FIGS. 10-12, the grommet assembly 41 includes a pin 236, a post 238, a mounting bracket assembly 240 and a grommet 242. The pin 236 is fixedly attached (e.g., welded) to the mounting bracket assembly 240 in the driver foot well 27 and extends outwardly therefrom. The pin 236 includes a head portion 244 and a shaft portion 246. The head portion 244 is fixedly attached to the mounting bracket assembly 240. The circular-shaped shaft portion 246 is threaded and extends from the head portion 244.

The post 238 is attached (e.g., threadably attached) to the pin 236 and includes an inner housing 248 and an outer housing 250. The inner housing 248 and the outer housing 250 are fixedly attached to each other using any suitable means (e.g., injection molding). The inner housing 248 is circular-shaped and includes an opening 250 extending therethrough. The opening 250 is threaded such that the inner housing 248 of the post 238 is threadably attached to the shaft portion 246 of the pin 236. The inner housing 248 also includes a stem 252 and an annular-shaped lip 254 extending radially outwardly from an end of the stem 252.

The outer housing 250 includes a body 256, a groove 258 and an end portion 260. As shown in FIG. 12, an annular recess 261 formed in an end of the body 256 receives the lip 254 of the inner housing 248. The groove 258 is positioned between the body 256 and the end portion 260 and defines an attachment angled surface 262 and a transitional angled surface 264. The attachment angled surface 262 extends inwardly from an end of the end portion 260 to an end of the transitional angled surface 264. The transitional angled surface 264 extends inwardly from an end of the body 256 to an end of the attachment angled surface 262. The mounting bracket assembly 240 is mounted to a vertical portion (not shown) of the vehicle floor 26 via a bolt (not shown) and includes an L-shaped bracket 263 and coupler 265. The bracket 263 and the coupler 265 are fixedly attached to each other. The pin 236 is fixedly attached to the coupler 265.

With reference to FIGS. 10-12, the grommet 242 includes a grommet base member 266 and an adapter member 268 attached to each other such that the first floor 24 is positioned or sandwich therebetween (FIG. 12). The grommet base member 266 includes a tubular-shaped body 270 and an annular-shaped flange 272 extending radially outwardly from an end of the body 270. The tubular-shaped body 270 is inserted through a bottom of an opening 273 of the first floor 24 such that the flange 272 contacts the bottom surface 83 of the first floor 24. A plurality of flexible catches 274 and a plurality of rectangular-shaped spacers 276 extend radially inwardly from an inner surface 278 of the body 270. The flexible catches 274 and the spacers 276 are also arranged in an alternating fashion around the inner surface 278 of the body 270.

The adapter member 268 includes a tubular-shaped body 280 and an annular-shaped flange 282 extending radially outwardly from an end of the body 280. The body 280 is inserted through a top of the opening 273 of the first floor 24 such that the flange 282 contacts the top surface 94 of the first floor 24. A rim 284 extends radially outwardly from another end of the body 280. When the body 270 is fully inserted through the bottom of the opening 273 of the first floor 24 and the body 280 is fully inserted through the top of the opening 273 of the first floor 24, the plurality of flexible catches 274 snap into engagement with the rim 284 such that the grommet base member 266 and the adapter member 268 are attached to each other (i.e., the flexible catches 274 contact a top side 285 of the rim 284 to prevent the grommet base member 266 and the adapter member 268 from separating from each other). In this way, the grommet 242 is secured to the first floor 24 and the first floor 24 is positioned between the grommet base member 266 and the adapter member 268.

With continued reference to FIGS. 1-9, installation and removal of the floors 24, 30, 32 into and out of the vehicle 10 will now be described in detail. First, a user (not shown) secures the slot grommets 44, the volcano grommet 138, the slot grommet 192 and the grommet 242 to the first floor 24, as described above. The user then positions the first floor 24 onto the vehicle floor 26 such that the slot grommet 44 is disposed around the pin 40 and the post 42 (i.e., the pin 40 and the post 42 extend through the slot grommet 44), the slot grommet 192 is disposed around the pin 188 and the post 190 (i.e., the pin 188 and the post 190 extend through the slot grommet 192). An opening 203 of the attachment member 76 of the slot grommet 44 is larger than a diameter of the post 42 (such that a gap 205 exists between the body 62 of the post 42 and the attachment member 76) and an opening 207 of the attachment member 198 of the slot grommet 192 is larger than a diameter of the post 190 (such that a gap 209 exists between a body 211 of the post 190 and the attachment member 198). In this way, the gap 205 allows for misalignment between the slot grommet 44 and the post 42 as the post 42 extends through the slot grommet 44, and the gap 209 allows for misalignment between the slot grommet 192 and the post 190 as the post 190 extends through the slot grommet 192.

The grommet 242 is attached to the post 238 (i.e., a protrusion 286 extending radially inwardly from an inner surface 288 of the body 280 of the adapter member 268 is securely received in the groove 258 of the post 238) when the first floor 24 is disposed onto the vehicle floor 26 such that the grommet 242 is disposed around the pin 236 and the post 238. The grommet 242 is movable laterally relative to the post 238 to allow for misalignment between the grommet 242 and the post 238 as the post 238 extends through the grommet 242. As shown in FIG. 12, a top surface 292 of the end portion 260 of the post 238 is substantially flushed with a top surface 296 of the flange 282 of the adapter member 268 once the grommet 242 is attached to the post 238.

The volcano grommet 138 is attached to the post 136 (i.e., protrusions 210 extending radially inwardly from an inner surface 212 of the body 170 of the volcano-grommet base member 166 are securely received in the groove 156 of the post 136) when the first floor 24 is disposed onto the vehicle floor 26 such that the volcano grommet 138 is disposed around the pin 134 and the post 136 (i.e., the pin 134 and the post 136 extend at least partially through the volcano grommet 138) and the first floor 24 remains in contact with the vehicle floor 26. As shown in FIG. 8, a top surface 213 of the end portion 158 of the post 136 is substantially flushed with a top surface 215 of the flange 172 of the coupling member 168 once the volcano grommet 138 is attached to the post 136.

Next, the user attaches the snap grommets 46 to the second floor 30, as described above. The user then positions the second floor 30 onto the first floor 24 in the driver foot well 27 such that the snap grommets 46 are attached to a respective post 42 (i.e., a protrusion 217 extending radially inwardly from an inner surface 214 of the body 116 of the connecting member 102 is securely received in the groove 64 of the post 42) and the snap grommets 46 are disposed around the pin 40 and the post 42 (i.e., the pin 40 and the post 42 extend at least partially through the snap grommets 46). In this way, the second floor 30 is secured to the vehicle floor 26 and the snap grommets 46 are disposed on top of the slot grommets 44 (i.e., the snap-grommet base members 100 are disposed on top of the attachment members 76 of the slot grommets 44), thereby restricting the vertical movement of the slot grommets 44. As shown in FIG. 5, a top surface 216 of the end portion 66 of the post 42 is substantially flushed with a top surface 218 of the flange 118 of the connecting member 102 once each snap grommet 46 is attached to the post 42.

Lastly, the user attaches the snap grommet 194 to the third floor 32, as described above. The user then positions the third floor 32 onto the vehicle floor 26 and the first floor 24 such that the snap grommet 194 is attached to the post 190 (i.e., a protrusion 220 extending radially inwardly from an inner surface 222 of a body 224 of the connecting member 202 is securely received in a groove 226 of the post 190) and the snap grommet 194 is disposed around the pin 188 and the post 190 (i.e., the pin 188 and the post 190 extend at least partially through the snap grommet 194). In this way, the first floor 24 and the third floor 32 are secured to the vehicle floor 26, and the snap grommet 194 is on top of the slot grommet 192, thereby restricting the vertical movement of the slot grommet 192. As shown in FIG. 9, a top surface 228 of an end portion 230 of the post 190 is substantially flushed with a top surface 232 of a flange 234 of the connecting member 202 once the snap grommet 194 is attached to the post 190.

To remove the floors 24, 30, 32 from the vehicle 10, the user removes the snap grommets 46 from the posts 42, the snap grommet 194 from the post 190 and the volcano grommet 138 from post 136. This allows the user to conveniently remove the floors 24, 30, 32 from the vehicle 10 for cleaning, for example.

One of the benefits of the grommet apparatus 35 of the present disclosure is that the grommet apparatus 35 permits easy installation and removal of one or more floors into and out of a vehicle without the need for tools or other equipment. Another benefit of the grommet apparatus 35 of the present disclosure is that the grommet apparatus 35 is adaptable for vehicles having multiple floors (e.g., carpet on which floor mats are disposed) that overlap each other at one or more locations throughout the vehicle. That is, when the floors overlap each other at one location in the vehicle for example, the grommet apparatus 35 secures the floors at the location of the overlap to the vehicle floor as well as securing the floors to the vehicle floor at locations where there is no overlap.

What is claimed is:

1. A grommet apparatus for a vehicle having a first floor and a second floor, the grommet apparatus comprising:
   a pin fixedly attached to a vehicle floor;
   a post attached to the pin; and
   a slot grommet including a slot-grommet base member and an attachment member attached to each other such that the first floor is positioned therebetween, the pin and the post extending through the slot-grommet base member and the attachment member, and
   a snap grommet removably coupled to the post and including a snap-grommet base member and a connecting member attached to each other such that the second floor is positioned therebetween, the pin and the post extending at least partially through the snap-grommet base member and the connecting member.

2. The grommet apparatus of claim 1, wherein the slot grommet is movable laterally relative to the first floor.

3. The grommet apparatus of claim 2, wherein the snap grommet restricts vertical movement of the slot grommet when the snap grommet is coupled to the post.

4. The grommet apparatus of claim 1, wherein the post is threadably attached to the pin.

5. The grommet apparatus of claim 1, wherein the snap-grommet base member is disposed on the attachment member.

6. The grommet apparatus of claim 1, wherein a gap exists between the post and the attachment member of the slot grommet to accommodate for misalignment between the slot grommet and the post.

7. The grommet apparatus of claim 6, wherein a top portion of the post is substantially flush with a top surface of the connecting member of the snap grommet.

8. The grommet apparatus of claim 1, further comprising:
   a second pin fixedly attached to the vehicle floor;
   a second post attached to the second pin; and
   a volcano grommet removably coupled to the second post and including a volcano-grommet base member and a coupling member attached to each other such that the first floor is positioned therebetween, the second pin and the second post extending at least partially through the volcano-grommet base member and the coupling member.

9. The grommet apparatus of claim 8, wherein the second pin extends perpendicular from to the pin.

10. The grommet apparatus of claim 9, wherein the volcano-grommet base member and the second post are equal in length.

11. The grommet apparatus of claim 10, wherein an end portion of the second post is substantially flush with a top surface of the volcano-grommet base member.

12. The grommet apparatus of claim 11, wherein the second post is threadably attached to the second pin.

* * * * *